(12) United States Patent
Griffaton

(10) Patent No.: US 9,032,803 B2
(45) Date of Patent: May 19, 2015

(54) METHOD FOR DETECTING DAMAGE IN AT LEAST ONE ENGINE ROLLER BEARING

(75) Inventor: Julien Griffaton, Paris (FR)

(73) Assignee: SNECMA, Paris (FR)

( * ) Notice: Subject to any disclaimer, the term of this patent is extended or adjusted under 35 U.S.C. 154(b) by 300 days.

(21) Appl. No.: 13/508,172

(22) PCT Filed: Nov. 3, 2010

(86) PCT No.: PCT/EP2010/066737
§ 371 (c)(1),
(2), (4) Date: Jul. 12, 2012

(87) PCT Pub. No.: WO2011/054867
PCT Pub. Date: May 12, 2011

(65) Prior Publication Data
US 2012/0272736 A1 Nov. 1, 2012

(30) Foreign Application Priority Data
Nov. 4, 2009 (FR) ...................................... 09 57801

(51) Int. Cl.
G01M 13/02 (2006.01)
G01M 13/04 (2006.01)

(52) U.S. Cl.
CPC .................................. G01M 13/045 (2013.01)

(58) Field of Classification Search
USPC ...................... 73/593, 658, 659, 660; 702/56, 702/183–185
See application file for complete search history.

(56) References Cited

U.S. PATENT DOCUMENTS

| | | | | |
|---|---|---|---|---|
| 5,511,422 | A * | 4/1996 | Hernandez | 73/593 |
| 6,116,089 | A | 9/2000 | El-Ibiary et al. | |
| 6,351,714 | B1 * | 2/2002 | Birchmeier | 702/56 |
| 6,389,887 | B1 * | 5/2002 | Dusserre-Telmon et al. | 73/114.77 |
| 6,408,696 | B1 | 6/2002 | Jong | |
| 6,553,837 | B1 * | 4/2003 | Lysen | 73/579 |
| 7,444,265 | B2 * | 10/2008 | Havela et al. | 702/183 |
| 7,770,458 | B2 | 8/2010 | Blanchard et al. | |
| 2002/0186039 | A1 * | 12/2002 | Devaney et al. | 324/772 |

(Continued)

FOREIGN PATENT DOCUMENTS

| | | |
|---|---|---|
| FR | 2 913 769 | 9/2008 |
| WO | 02 089305 | 11/2002 |
| WO | 2004 109250 | 12/2004 |

OTHER PUBLICATIONS

International Search Report Issued Dec. 14, 2010 in PCT/EP10/66737 Filed Nov. 3, 2010.

*Primary Examiner* — Helen Kwok
(74) *Attorney, Agent, or Firm* — Oblon, McClelland, Maier & Neustadt, L.L.P.

(57) ABSTRACT

A method including acquiring a current vibration signal of an engine component mechanical vibration across a set of a measuring period P of changes in shaft speed N; capturing the signal during the period P; synchronizing the signal relative to the changes in the speed N; transforming the signal into a frequency signal for obtaining frequency spectrum lines arranged according to the speed N; calculating the mean amplitude of the spectrum lines to obtain a current vibration signature for the engine; calculating a deviation ratio between the signature and a healthy reference vibration signature; and comparing the deviation ratio to the defect indicators in a predefined database, listing the theoretical damage to the roller engine bearings so as to determine potential damage to the roller bearing.

14 Claims, 9 Drawing Sheets

(56) References Cited

U.S. PATENT DOCUMENTS

| | | |
|---|---|---|
| 2003/0106375 A1 | 6/2003 | Sabini et al. |
| 2004/0186680 A1* | 9/2004 | Jin et al. .................. 702/147 |
| 2004/0199348 A1* | 10/2004 | Hitchcock et al. .............. 702/92 |
| 2007/0032966 A1* | 2/2007 | Song ............................... 702/35 |
| 2007/0095142 A1 | 5/2007 | Samson, Jr. |
| 2007/0198219 A1 | 8/2007 | Havela et al. |
| 2008/0223135 A1 | 9/2008 | Blanchard et al. |
| 2011/0178772 A1 | 7/2011 | Gerez et al. |

* cited by examiner

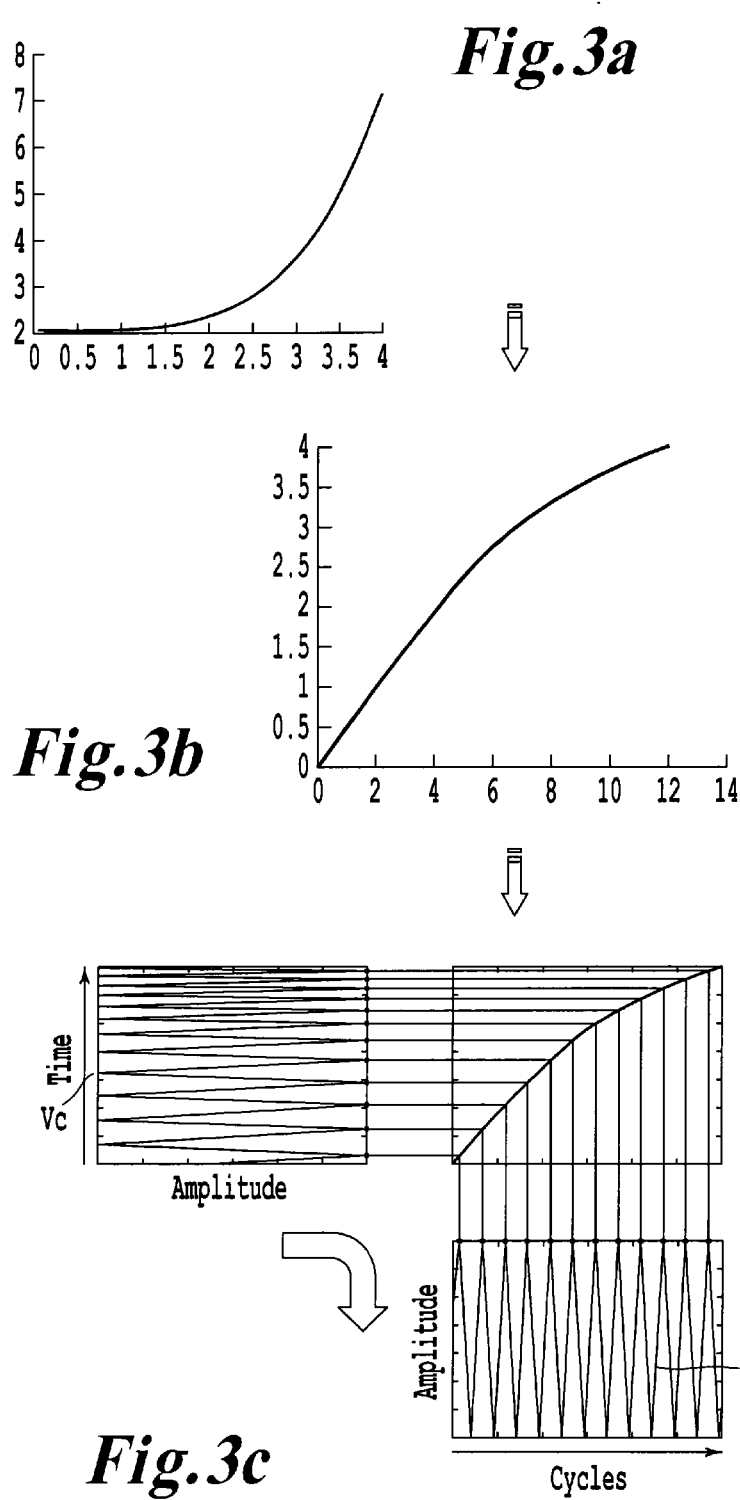

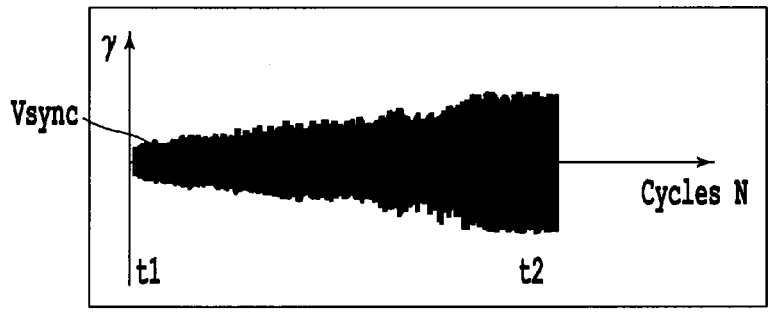
*Fig.4a*
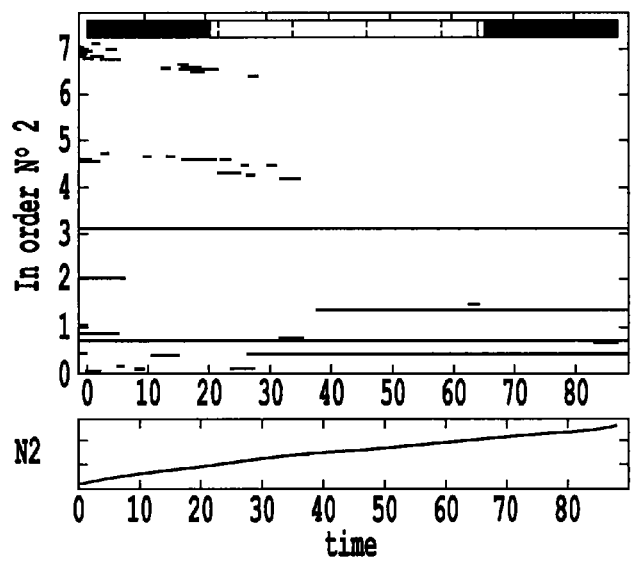
*Fig.4b*
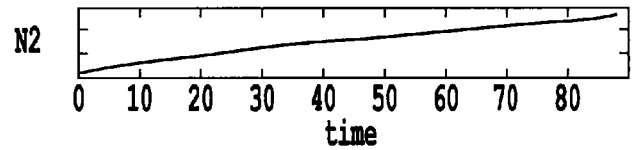
*Fig.4c*
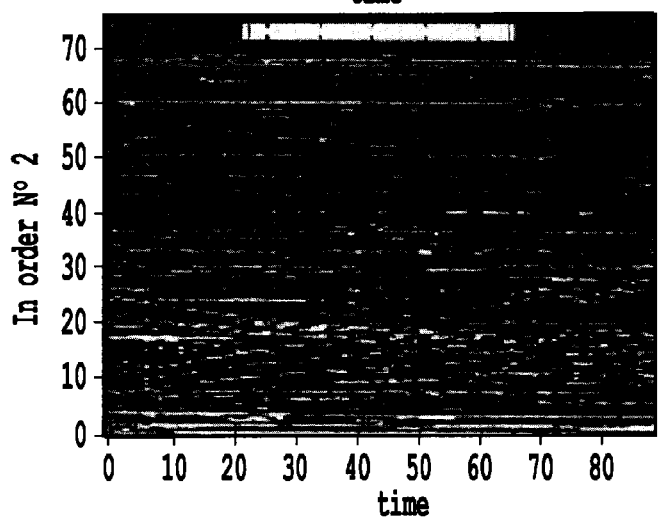  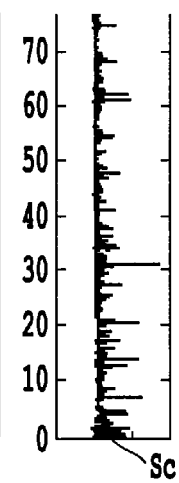
*Fig.4d*   *Fig.4e*

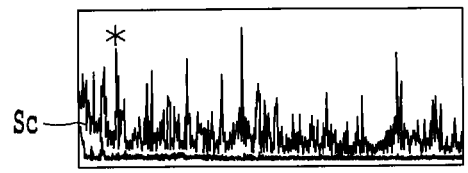
*Fig.5a*
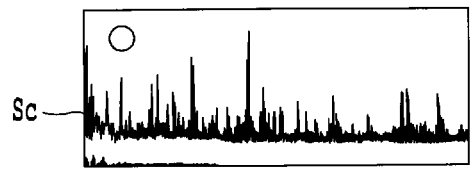
*Fig.5b*
| Configuration file | engine brg #3 | engine brg #4 | engine brg ... | RDS interm brg | AGB line #3 font brg | AGB line... |
|---|---|---|---|---|---|---|
| D (m) | 0.1676 | 0.15 | ... | 0.049 | 0.0485 | ... |
| d (m) | 0.0222 | 0.012 | ... | 0.005 | 0.008 | ... |
| n | 20 | 30 | ... | 20 | 14 | ... |
| p (") | 60 | 0 | ... | 0 | 0 | ... |
| GTR (gear train ratio) | . | . | ... | (47x35) | (47.05)x(31/4) 0x(40/71)x(3 | ... |
| $N_{mn}$ or race | NHP | NLP | ... | NHPxGTR | NHPxGTR | ... |
| $N_{out}$ or race | 0 | NHP | ... | 0 | | |
| first order for outer race | 9.34 | 13.73 | ... | 8.98 | | |
| first order | ... | ... | ... | ... | | |
*Fig.5c*
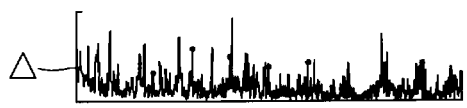
*Fig.5d*
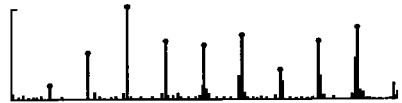
*Fig.5e*

METHOD FOR DETECTING DAMAGE IN AT LEAST ONE ENGINE ROLLER BEARING

BACKGROND OF THE INVENTION

1. Field of the invention

The present invention relates to the monitoring of engine wears, in particular, the wear of roller bearings rotationally supporting at least one rotating shaft of the engine.

2. Description of the Related Art

A roller bearing in an aeronautical turbomachine supports the shafts of the high pressure and low pressure bodies of the turbomachine. A distinction is made between the conventional roller bearings supporting a shaft with respect to a fixed casing of the turbomachine and the roller bearings supporting a first shaft with respect to a second shaft being known as "inter-shaft bearing".

The break of roller bearings is able to stop the rotation of the shaft supported by the bearing, which can lead to the total stop of the engine and thus potentially endanger the life of passengers of an aircraft on which the turbomachine would be mounted. Further to the break of the bearing, debris thereof enter between the different elements of the turbomachine which must be replaced as a whole. While detecting the wear of the bearings, a damaged bearing can be replaced before its break, which allows the lifetime of the turbomachine to be increased.

In order to detect the wear of roller bearings, simple methods are known, wherein a vibration signal of a gas turbine machine is measured so as to calculate the vibration power of the signal with a statistical method (statistical moment method so-called RMS method consisting in calculating the square root of the square average, etc. Then, the vibration power of the signal is compared to a detection threshold being empirically determined. If the signal power exceeds the detection threshold, a wear of the roller bearings is detected. Such a method is only adapted for turbomachines used in an environment being little or not noisy, for example for electrical power production turbines.

An aeronautical turbomachine is used in a strongly noisy environment (combustion noise, noise caused by the aerodynamic flow, numerous harmonics of the rotation speeds of the high and low pressure shafts, noise relative to the unbalanced masses, etc.). Consequently, a method, such as previously described, is not adapted.

For an aeronautical turbomachine, there is presently at disposal a defect database grouping together the totality of the damages in the engine roller bearings. Such base preferably comprises the defects of all the rollers of the engine bearings.

As an example, the defect database comprises the frequencies being characteristic of a defective internal ring and a defective external ring of an inter-shaft roller bearing. In fact, if there is a defect at the surface of an external ring of a roller bearing, this defect is going to generate an impact each time a rolling element will meet the defect. Thus, each defect can be characterized by a theoretical frequency or a plurality of theoretical frequencies grouped together as defect indicators, being themselves grouped together in the defect database.

The frequency resulting of the damage of the roller bearing is proportional to the rotation speed of the shaft(s) supported by the bearing, the frequency propagating by vibrations across the turbomachine components. A detection method adapted for the aeronautical field consists in making a vibration level research for the turbomachine components at high operating speed thereof. To do so, such method is supposed to acquire during a complete flight cycle a vibration signal coming from one or more vibration sensors which can detect vibrations from the turbomachine components. The detection of damage in a roller bearing is then realized from the identification of vibration levels higher than a predefined threshold for a healthy roller bearing and for which a same factor is identified. For example, it will be referred to the European Patent Application EP 1,111,364, which describes an embodiment of such a method.

However, trials with damaged roller bearings have shown that the damage detection is not systematic with such a method. In fact, the measurements of the vibration sensors are polluted at a high operating speed of the turbomachine by the natural vibration environment, what makes the vibration levels characteristic of damage hardly visible.

Furthermore, the patent application FR 2,913,769 A1 of SNECMA, discloses a detection method, wherein a vibration signal is measured during a renewable activity at a low speed of the engine. Such method allows a defect to be detected for only one roller bearing. Moreover, all the methods of the prior art are limited to detect the defects for a single roller bearing type for a determined stabilized speed (low or high speed). However, some of the defects only occur at high or low speed.

BRIEF SUMMARY OF THE INVENTION

The Applicant wishes to propose a universal method allowing the defect of the set of bearings to be detected, the detection method being to be rapidly implemented so as to make a diagnostic in real time. Moreover, the Applicant has tried to increase the precision of the detection so as to be able to determine in a reliable and reproducible way if at least one roller bearing is defective.

To do so, the invention relates to a detection method for damage of at least one roller bearing rotationally supporting at least one rotary shaft of an engine, characterized in that it comprises the steps consisting in:

a) defining a measuring period during which the shaft speed varies between a low speed and a high speed;

b) acquiring over the whole measuring period P a current vibration signal of a mechanical vibration in the engine components;

c) sampling the current vibration signal during the measuring period;

d) synchronizing the sampled vibration signal with respect to the variations of the shaft speed over the measuring period;

e) converting the sampled and synchronized vibration signal into a frequency signal so as to obtain frequency spectral lines arranged according to the rotation speed of the shaft;

f) calculating the mean amplitude of the spectral lines so as to obtain a current vibration signature for the engine;

g) calculating a deviation ratio between the current vibration signature of the engine and a healthy reference vibration signature; and h) comparing the deviation ratio to defect indicators of a pre-established database, listing the theoretical damages of the engine roller bearings so as to determine the potential damages of the roller bearing.

The invention is presented herein for a measuring period during which the shaft speed varies between a low speed and a low speed, but the invention also applies obviously between a lower speed and a higher speed, the important fact being that the engine speed is variable between two determined speed values. Preferably, the higher speed is a high speed and the lower speed is a low speed.

Thanks to the invention, a great number of damages can be measured on a broad range of shaft speeds, some damages only occurring at certain speeds. In other words, the method of the invention allows any type of damages to be detected and this, for the set of engine bearings. A precise detection is possible through the combination of a variable speed measurement, a synchronization of the vibration signal and the comparison to healthy reference vibration signature.

Preferably, the healthy reference vibration signature is a healthy reference vibration signature of the engine.

The deviation ratio being measured is thus characteristic of the troubles associated with the damages of the roller bearings, because the healthy vibration signature is very relevant. In comparison with the deviation speed fixed by thresholds, it is not necessary to take into account the dispersals of the thresholds as a function of the engines, since the comparison basis, i.e. the healthy reference signature, has been formed for the engine on which damage detection is performed. Detection is custom-made for the engine, which is a token of precision in detection.

The healthy vibration signature of the engine is formed by calculating a mean of current vibration signatures of the engine being measured over a determined period of the lifetime of the engine, preferably at the start of the lifetime of said engine.

In fact, it is very probable that the better behaviour of the engine (the healthiest) is obtained upon the first flights of the engine, such flights being thus able to serve as reference.

Still preferably, the healthy vibration signature of the engine has been previously validated in comparison with a standard family signature defined for the family of said engine.

Such preliminary validation advantageously allows the use of a defective signature to be avoided as a reference for deviation ratio calculation.

Still preferably yet, a standard family signature is formed with healthy reference signatures of engines of the same family. This advantageously allows the differences to be smoothed between a same family of engines, the major part of the engines being healthy engines.

Preferably, a set of healthy reference signatures if formed for a plurality of engines of the same family,
- a family discordance ratio is calculated for each healthy reference signature by measuring the statistical deviation between said healthy reference signature and the other healthy reference signature of the set,
- from the set of healthy reference signatures, these having a discordance ratio higher than a determined discordance ratio are removed, and
- the standard family signature is formed from remaining reference vibration signatures.

Thanks to the above-mentioned steps, the "black sheep's" are eliminated from the set of reference signatures so as to only hold the reference signatures the probability to be healthy is high.

Preferably, a family discordance ratio is calculated for each healthy reference signature by measuring the statistical deviation between said healthy reference signature and a temporary family signature formed from the other healthy reference signature of the set.

According to a preferred implementation of the invention, the method further comprises a step consisting in eliminating the spectrogram noise as a function of the structural modes of the engine, the noise elimination being performed before calculating the mean amplitude of the spectral lines.

Such "noiseless" step advantageously allows a relevant current vibration reference to be obtained with no disturbances.

Preferably, the vibration signal being sampled with respect to the variations of the shaft speed over the measuring period by sampling again the signal being sampled at constant frequency is synchronised into a signal being sampled at a frequency proportional to the shaft speed.

Still preferably, the vibration signal being sampled with respect to the variations of the shaft speed over the measuring period by calculating an angular path curve of the shaft in the order field and by projecting the current vibration signal on said angular path curve so as to obtain a synchronized current vibration signal.

According to an aspect of the invention, the healthy reference vibration signature is a standard family signature defined for the family of said engine. In comparison with a reference signature specific to the engine, the family signature can be easily obtained and is easier to be implemented.

Indeed, a single family reference signature can be used for a great number of engines of a same family, whereas the reference signature of the engine, i.e. an individual reference signature, can only be used for only one engine. In order to track wear in a plurality of engines over the time, it is necessary to manage a database grouping together the individual signatures of said engines. The family reference signature allows this disadvantage to be alleviated.

Preferably, the standard family signature is formed from healthy reference signatures of engines of the same family. On a similar way, all steps for forming a standard family signature as previously mentioned apply for a comparison of current signature of the engine with a family reference signature.

BREIEF DESCRIPTION OF THE SEVERAL VIEWS OF THE DRAWING

The invention will be better understood with the help of the accompanying drawings, wherein:

FIG. 1 represents a diagram of the different steps of the method according to the invention for a test engine;

FIG. 2 represents the definition step for a measuring period of a vibration signal of the engine components, wherein:
- the curve 2a represents a measurement of the shaft speed over the time:
- the curve 2b represents a measurement of the shaft acceleration over the time;
- the curve 2c represents the current vibration signal of the test engine Vc measured by an accelerometer between the times t1 and t2 defined with respect to the curves 2a and 2b;

FIG. 3 represents a synchronization example for a vibration signal, wherein:
- the curve 3a represents the shaft acceleration over the measuring period P;
- The curve 3b represents the angular path time of the shaft as a function of the number of revolutions of the shaft;
- the curve 3c represents the projection of a current vibration signal Vc on the curve 3b so as to obtain a synchronized current vibration signal Vsync;

FIG. 4 represents the formation step for the current signature of the engine Se, wherein:
- the curve 4a represents the synchronized current vibration signal of the test engine Vsync;
- the schema 4b represents an order spectrogram for the synchronized current vibration signal of the test engine Vsync;
- the schema 4c represents the acceleration of the rotation speed of the shaft over the period of time P;
- the schema 4d represents the order spectrogram for the schema 4b after noise elimination;
- the curve 4e represents the current signature Se being calculated from the noiseless spectrogram 4d;

FIG. 5 represents the calculation steps for the deviation ratio, wherein:
  the curve 5a represents the current vibration signature of the test engine Se;
  the curve 5b represents the healthy vibration signature of the test engine Ss;
  the table 5c represents an extract of the defect database in the engine roller bearings;
  the curve 5d represents the deviation ratio between the healthy vibration signature Ss of the test engine of the curve 5b and its current signature Se of the curve 5a;
  the curve 5e represents the recognition ratio between the calculated deviation ratio of the curve 5d and the defects listed in the table 5c;

DETAIED DESCRIPTION OF THE INVENTION

Figure 1:
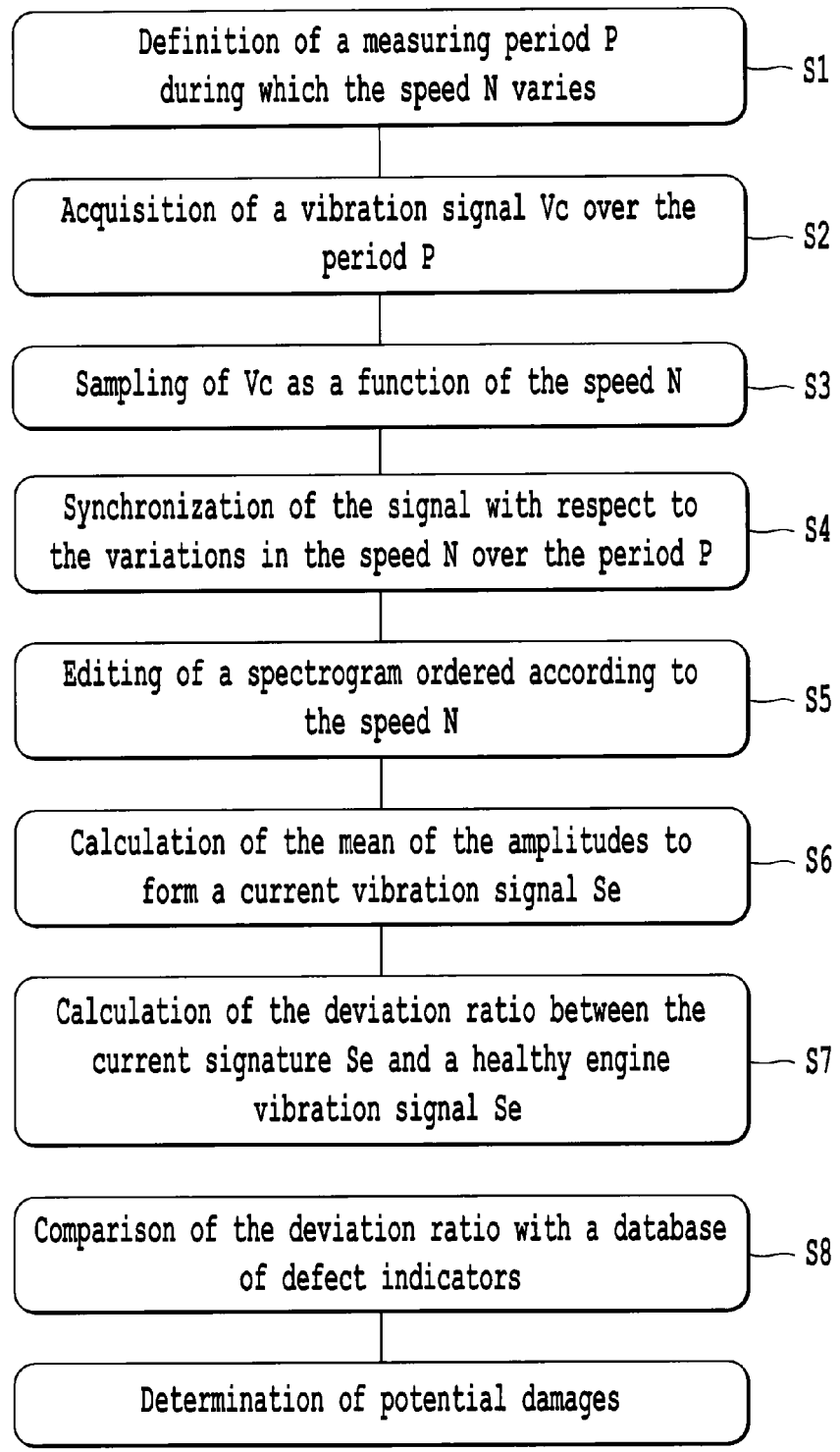

It is referred to the FIG. 1 which shows the constitutive steps of a method according to the invention.

Generally, the invention applies to any type of engine possessing at least one rotating shaft and at least one roller bearing. Amongst such engines, for example airplane gas turbine engines (so-called turbomachines) or helicopter engines, terrestrial gas turbines, gearing casings, axle engines, etc.

The principle on which the invention is based is that the frequency resulting from the damaging of the roller bearing is proportional to the rotation speed of the rotating shaft supported by the bearing. The hypothesis is that such frequency will be transmitted to an acceleration sensor through engine components vibrating themselves, in particular at the fundamental frequencies. The present invention aims at measuring a global vibration signal comprising the defects of a plurality of roller bearings. In order to highlight such defects, the signal is measured during a variation of the shaft speed, i.e. during a variation of the rotation speeds of the shafts.

(S1) Definition of the Measuring Period P

A first step (S1) of the method according to the invention consists in defining a measuring period P during which the shaft speed N is variable. As an example, the shaft speed N varies between a low speed operation and a high speed operation. Since the speed N varies strongly, the measured vibration signals have very different types, a same damaging of a roller bearing having a vibration contribution being different as a function of the engine speed.

Such a determination of the measuring period P is in opposition with the current practices of the men of the art who favoured an operation at a stabilized speed of the engine, i.e. at constant speed, so as to be able to obtain variations of the same type and thus to be able to compare and identify them. The Applicant has chosen quite another path by privileging the heterogeneity of the vibrations measured so as to be able to detect a great number of damages occurring when the engine operates at a variable speed.

Furthermore, the Applicant has chosen to consider not only the low speed operation, but also the high speed operation, whereas the method of the prior art focussed only on a narrow speed range. The method according to the prior art needed to perform a distinct measurement for each speed, thereby leading to interpretation mistakes and inaccurate detection of the damages when the low and high speed results were compared.

By choosing such a measuring period P, the Applicant has thus overcome a prejudice relative to the need of a stabilized operation analysis as well as a prejudice relative to the need of a given speed analysis.

The measuring period P is thus determined as a function of the rotation speed(s) of the shaft over the time. In the following, the case is considered of the detection of a damage in a roller bearing for an inter-shaft bearing rotationally supporting a rotating shaft of the low pressure body with respect to a rotating shaft of the high pressure body of the turbomachine, and comprising an external ring connected to the high pressure shaft and an internal ring connected to the low pressure shaft. In the case of a turbomachine, the present invention could also apply for the detection of the damage of a ball or roller bearing rotationally supporting one single rotating shaft with respect to a fixed element of the engine.

For the remaining of the description, N1 and N2 mean the rotation time speeds, respectively, of the low pressure shaft and the high pressure shaft of the turbomachine which are supported by the bearing. The determination of the measuring period P consists, in a first time, in calculating the rotation speeds of the different components from, for example, tachometer probes arranged in the engine.

The rotation speed allows measuring periods to be selected for operation ranges being appropriate and reproducible from a flight to another one, which allows comparable measurements to be performed for each flight. In order to be able to detect if the operation range is appropriate, the time derivatives of the rotation speed are calculated as shown on FIG. 2b.

Still preferably, the measuring period P should have a minimum duration so as to be able to perform the subsequent steps of the method, for example, a Fourier transform. Furthermore, a maximum period is contemplated so as to limit the storing spaces upon the implementation of the subsequent processing steps.

In such embodiment, the measuring period P is determined by imposing:
  a minimum threshold corresponding to the low speed and a maximum threshold corresponding to the high speed, to the rotation speed (N1, N2) of each shaft, the minimum threshold being, in such example, equal to 20% of the maximum speed of the shaft and the maximum threshold corresponding to the admissible maximum speed by the machine;
  a minimum threshold and a maximum threshold on the derivatives of the rotation speeds (N1, N2) of each shaft, the minimum threshold being, in this example, equal to 10% of the admissible maximum speed per minute, the maximum threshold being for example equal to 200% of the maximum speed per minute;
  a minimum period (here 10 seconds), for which the previous conditions are filled and a maximum analysis period (here 100 seconds).

Figure 2A:
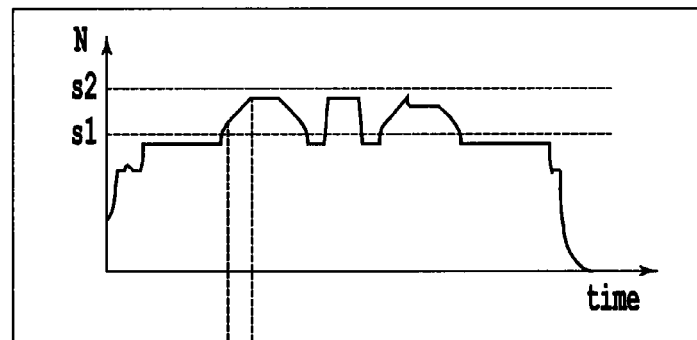
Figure 2B:
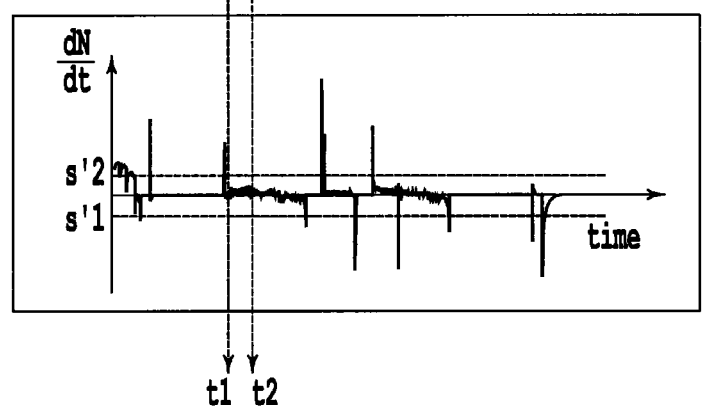
Figure 2C:
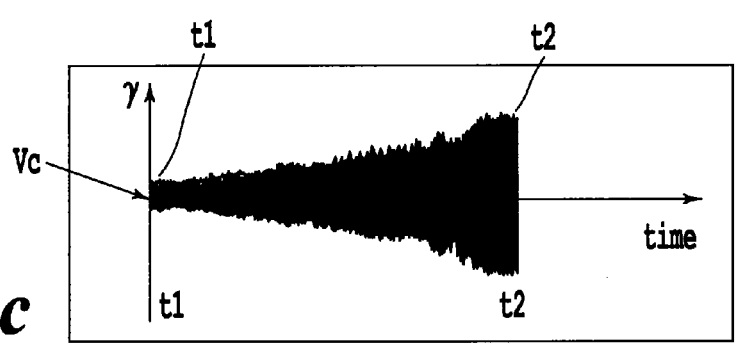

In such implementation of the invention, referring to FIG. 2, a current vibration signal Vc is measured during a speed acceleration of the shafts of the engine from idling (low speed) to full speed (high speed).

A conventional logic has been previously described with determined thresholds and durations, but it is obvious that a fuzzy logic could also be convenient. Fussy logic allows acceptable measuring periods P to be defined even if all the conditions are not strictly filled, which reduces the limitative character of the fixed thresholds and increases the number of potential measuring periods P so as to implement the detection of damages.

(S2) Acquisition of a vibration signal

The next step (S2) consists in acquiring over the whole measuring period P a current vibration signal Vc of the engine components. Such a signal comes from a vibration sensor (for example, an accelerometer or a strain gauge) being previously arranged on a fixed component of the engine.

(S3) Sampling of a Vibration Signal

The current vibration signal Vc is then sampled as a function of the rotation speed N of the shaft over the measuring period P during a step S3. In such embodiment, the current vibration signal Vc is sampled at the frequency of about a few kilohertz.

(S4) Synchronization of the Vibration Signal

The current vibration signal Vc is then processed appropriately for the damaging diagnostic for the bearing. To do so, a first step consists in re-sampling the current vibration signal Vc as a function of the variation of the rotation speed N of the shaft. Those variations of the speed N of the shaft supported by the roller bearing correspond to the evolution of the relative rotation speed of the roller bearing. In other words, the vibration signal Vc is synchronized with respect to the relative speed variation of the roller bearing.

In the case of a roller bearing, the external ring of which is fixed, being connected to a fixed element of the engine, and the internal ring of which supports a shaft, the relative speed of the roller bearing corresponds to the rotation speed of the shaft supported by the roller bearing. In the case of a co-rotating inter-shaft bearing, the relative speed is the difference between the rotation speeds of the two shafts. For a contra-rotating inter-shaft bearing, the relative speed is the sum of the rotation speeds of the two shafts.

In order to better understand the principle of the synchronization of a vibration signal Vc, the synchronization step is applied to a current vibration signal Vc of a simple shape, as represented on FIG. 3c.

Referring to FIG. 3c, a current vibration signal Vc is measured on a measuring period P, during which the relative speed of the roller bearing, i.e. the speed N, increases over the time, the speed of the shaft N to which the roller bearing is connected increasing as represented on FIG. 3a, the current vibration signal Vc having a larger and larger frequency over the time, as represented on FIG. 3c.

Thus, if it is desired to measure variation amplitudes on the current vibration signal Vc over the time with a constant resolution, the current vibration signal Vc can be easily analysed at the start of the measuring period P, because the sinusoids are spaced apart, whereas the resolution is not sufficient at the end of the measuring period P when the sinusoids are close to each other, the resolution for the analysis being not sufficient. Then, it is said that the current vibration signal Vc is compressed at the end of the measuring period P.

This phenomenon was not present in the prior art, since the measurements were performed at a stabilized speed with no variations of the engine speed. The choice of the Applicant to perform a detection at variable speed is in opposition with the methods of the prior art. Indeed, choosing a measuring period on a variable speed means for the man of the art to give up the conventional processing methods which are only adapted for the stationary signals.

To eliminate this disadvantage, the current vibration signal Vc is synchronized with respect to the relative speed of the roller bearing, with respect to the rotation speed of the engine.

In reference to the curve 3b of FIG. 3, the time necessary to perform a rotation of the roller bearing is determined, the curve 3b being designated by angular path curve. One rotation of the roller bearing corresponds to one rotation of the internal ring in the fixed referential of the external ring. The curve 3b can be easily obtained by integration of the function of the curve 3a representing the relative speed of the roller bearing with respect to the time. Such synchronisation is present under the form of a sliding modulation allowing the current signal to be distributed over the measuring period P.

In reference to FIG. 3c, it is then sufficient to project the current vibration signal Vc on the angular path curve 3b to obtain a synchronized current vibration signal Sync, the sinusoids of which are regularly spaced apart, thereby showing that the different frequencies of the current vibration signal Vc are no longer correlated. For the projection, a new signal sampling is implemented by sampling regularly spaced points on the angular path curve 3b.

FIG. 3 represents an example of synchronization of a current vibration signal Vc, which can be transposed without any difficulty for the man of the art to a more complex vibration signal with a less linear evolution of the rotation speed N.

The synchronization of a current vibration signal Vc, measured in part at low speed and in part at high speed, as a function of the relative speed of a roller bearing allows the subsequent processing steps to be easier, as will be detailed hereinunder.

More simply, through the synchronization operation as a function of the rotation speed N, a signal being sampled at constant frequency is converted into a signal sampled at a frequency proportional to the speed.

(S5) Edition of a Spectrogram

The next step (S5) consists in converting the sampled and synchronized vibration signal Vsync into a frequencial signal to obtain frequencial spectral lines ordered according to the rotation speed N on the shaft, which corresponds to the edition of a spectrogram being ordered according to N. Such a type of order spectrogram is known from the men of the art.

It is to be noticed that, because of the synchronization of the current vibration signal Vc, a spectrogram such as in the prior art is obtained, wherein the current vibration signal Vc was obtained at a stabilized speed.

The preliminary synchronization of the vibration signal, as detailed at step (S4), allows a spectrogram to be formed, comprising horizontal lines, as represented on the curve 4b of FIG. 4. The signal having been synchronized with respect to the rotation speed of the shaft represented on the curve 4c, each spectral line corresponds to a rotation frequency of the synchronized vibration signal. In the mathematical sense, the rotation frequencies of the synchronized vibration signal VSync are split up in the order mathematical base.

Thus, the spectrogram comprises horizontal lines, the amplitude of which varies over the measuring period P, the amplitude of one line being represented by a gray level, as represented on the curve 4b of FIG. 4.

The spectrogram of FIG. 4b is a spectrogram of the power spectral densities, being known from the man of the art under its English designation "PSD" for "Power Spectral Density", the main calculation parameters for such spectrogram being the number of points for the quick Fourier transform (FFT) and the covering of the sliding window for the FFT, such parameters being known from the man of the art.

It is obvious that other types of spectrograms could also be obtained, the important thing being that they are ordered according to the speed N of the shaft so as to obtain horizontal spectral lines, i.e. of a constant order.

Preferably, a noise cleaning step is performed for the order spectrogram so as to obtain a spectrogram only comprising relevant spectral lines for detecting a damage of the roller bearings.

After the order spectrogram has been edited, the latter comprises essentially three types of information:
- thin horizontal lines, characteristic of the activity connected to the rotation speed (for example, in the case of an airplane engine: unbalanced masses, gearings, blade passages, roller bearings), these horizontal lines corresponding to the relevant information;
- oblique lines, characteristic of an activity connected to the rotation speeds of other mechanically independent rotors, such component being particularly important when the rotation speed varies between a low speed operation and a high speed operation. The obliquity of the lines is connected to the synchronization of the vibration signal with respect to the rotation speed of the shaft;
- energy flats corresponding to the modes of the engine structures, a structural mode corresponding, for example, to the natural resonance of a structure, of a casing, of the turbomachine on its suspensions.

The two last types of information correspond to noise being to be eliminated. The present step aims at eliminating energy flats (third type of information). Indeed, the noise elimination algorithm comprises steps consisting in:
- running on each vertical line of the spectrogram (along the frequencies) with a sliding window of a predetermined size;
- identifying the structural modes by calculating, for each sliding window, the mean value or a percentile of the amplitudes being present in the sliding window;
- determining the value of the amplitude peaks by subtracting the structural modes at the vertical line of the spectrogram;
- calculating the ratio (value of the amplitude peaks/structural modes) so as to form a new line of the order spectrogram with no noise; and
- passing to the next vertical line.

In reference to the spectrogram 4d of FIG. 4, a new order spectrogram with no noise connected to the energy flats is obtained; the order spectrogram 4d is said noiseless.

(S6) Formation of the Current Vibration Signature

The time mean of the amplitudes of the spectral lines is then calculated (step S6). Such step consists in:
- running on each horizontal line of the order spectrogram, the spectrogram having been preferably previously exempted of noise;
- calculating the mean of the amplitudes along the time axes.

The curve 4e of FIG. 4 represents the mean of the amplitudes of the spectral lines as a function of the orders of the rotation speed; such mean of the amplitudes corresponds to the current vibration signature of the engine Se. It comprises all the amplitudes characteristic of the frequencies of the engine in the order field.

The time mean, such as implemented in the present invention, is very advantageous, taking into account the preliminary step of synchronization (S4) which has spread obliquely on the spectrograms the noise of the speeds connected to the other roller bearings. As the noise of the speeds is oblique, the calculation of the mean of the amplitudes according to the horizontal direction allows the noise of the speed to be smoothed. The latter possesses thus a weak and constant amplitude in the current vibration signature Se. Thus, everything that is not ordered is reduced by the mean effect, thereby allowing the appearance of ordered phenomena to be underlined, for example, an inter-shaft roller bearing defect.

(S7) Determination of the Damages

A deviation ratio is calculated between the current vibration signature of the engine Se, previously calculated, and a pre-established healthy vibration signature of the engine Ss, which comprises all the amplitudes characteristic of the frequencies of the healthy engine in the order field. The formation of the healthy vibration signature Ss of the engine will be now detailed.

Formation of a Healthy Vibration Signature Ss of the Engine

A healthy vibration signature (s) of the engine is a signature specific to each healthy engine. Said healthy vibration signature of the engine comprises a plurality of reference parameters for each vibration sensor (or acoustic sensor), for each operation mode (operating ranges) and for each field (frequency field, order field of a speed, etc.).

A reference parameter of the healthy vibration signature Ss is made of the following elements: a mean value and a standard deviation, or a median value and interquartile deviation. Such values are evaluated from the acquisition and the analysis of the first flights of said engine, i.e. from the first current signatures of the engine. Indeed, the engine is supposed to be devoid of defects upon the first flights thereof. The healthy signature of an engine Ss is used as a reference for the implementation of the detection method for said engine.

The healthy vibration signature Ss of the engine corresponds to the measurement of all the relevant parameters for detecting a damage of a roller bearing which has been measured on the healthy engine. As the healthy vibration signature Ss is used as a reference to determine the deviation ratio, it is important that such healthy vibration signature Ss corresponds effectively to a healthy engine and not to a damaged engine. Should this be the case, healthy roller bearings would be considered as damaged and reciprocally. Indeed, a preliminary validation step for the healthy vibration signature Sd of the engine is performed.

Validation of the Healthy Vibration Signature Ss of the Engine

In order to validate the healthy vibration signature Ss of the engine, a standard family signature Sfam is formed, which is a reference of the healthy behaviour of a family of engines. Such family signature Sfam allows to validate, upon the formation of a healthy vibration signature Ss of the engine (i.e. a signature specific to each engine), that such healthy vibration signature Ss is representative of a healthy engine.

Figure 7:
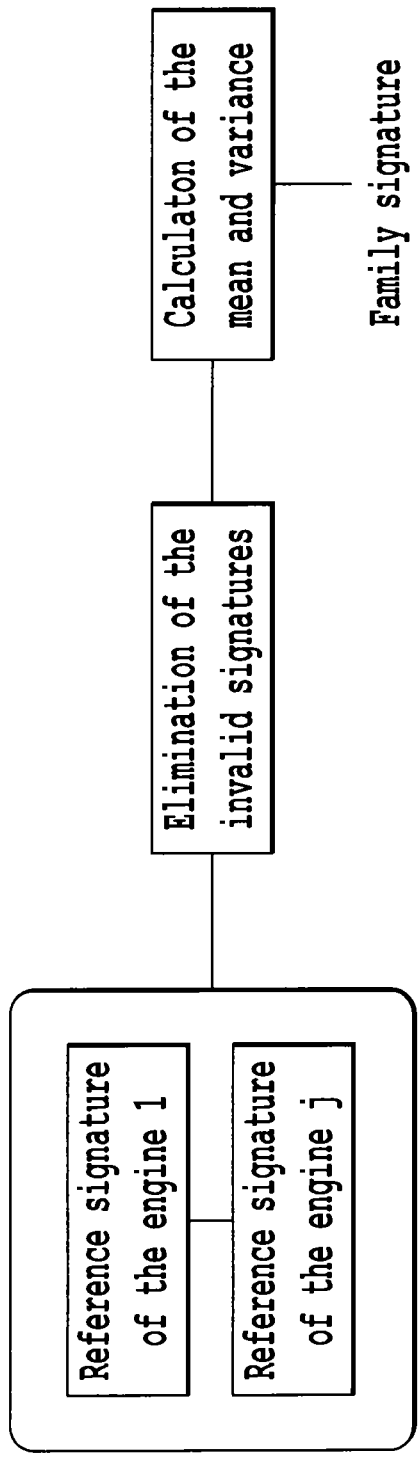
FIG. 7 represents the formation step for the standard family signature Sfam from a plurality of the engine reference signatures Sref.
Figure 8:
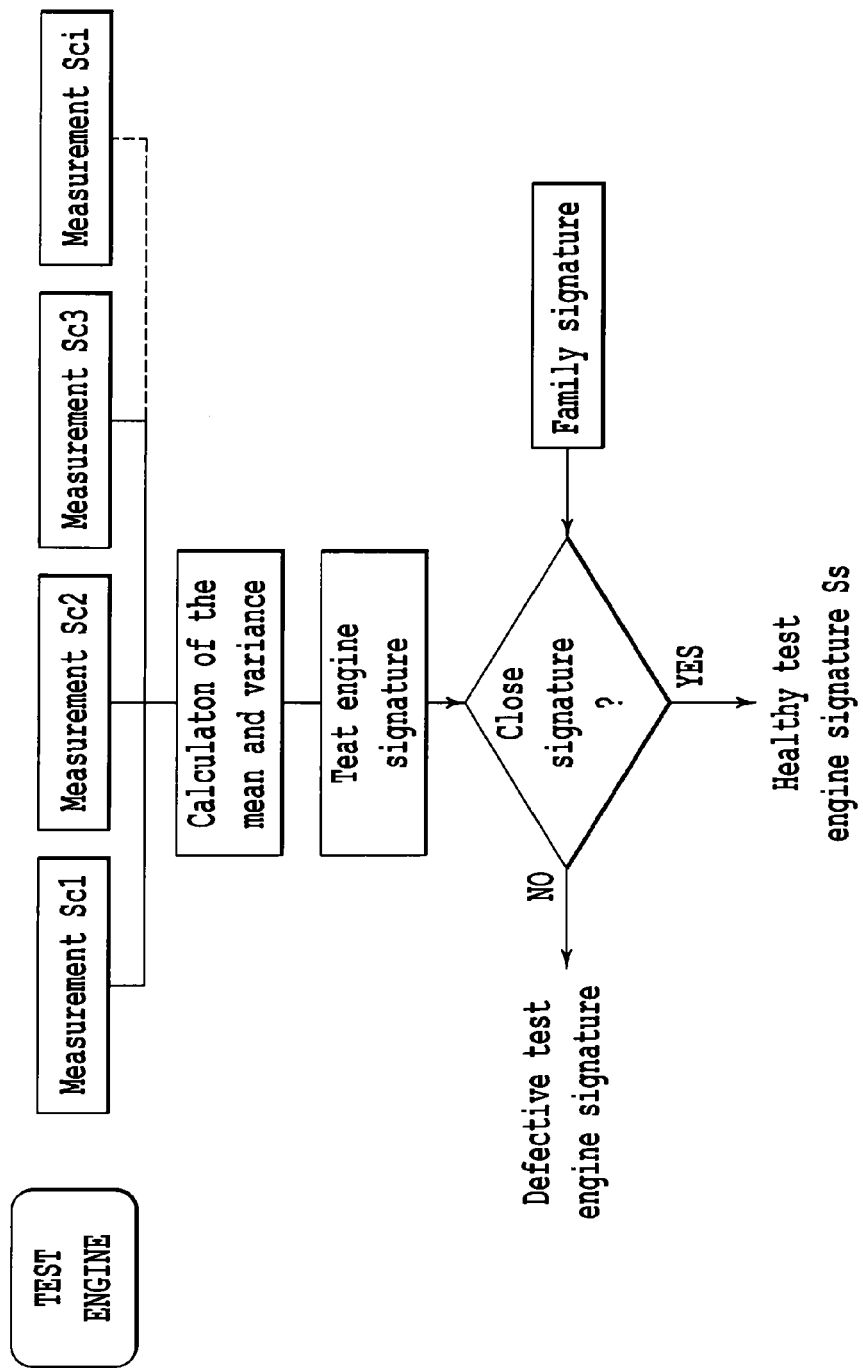
FIG. 8 represents the validation step for the signature of the test engine.
Figure 9:
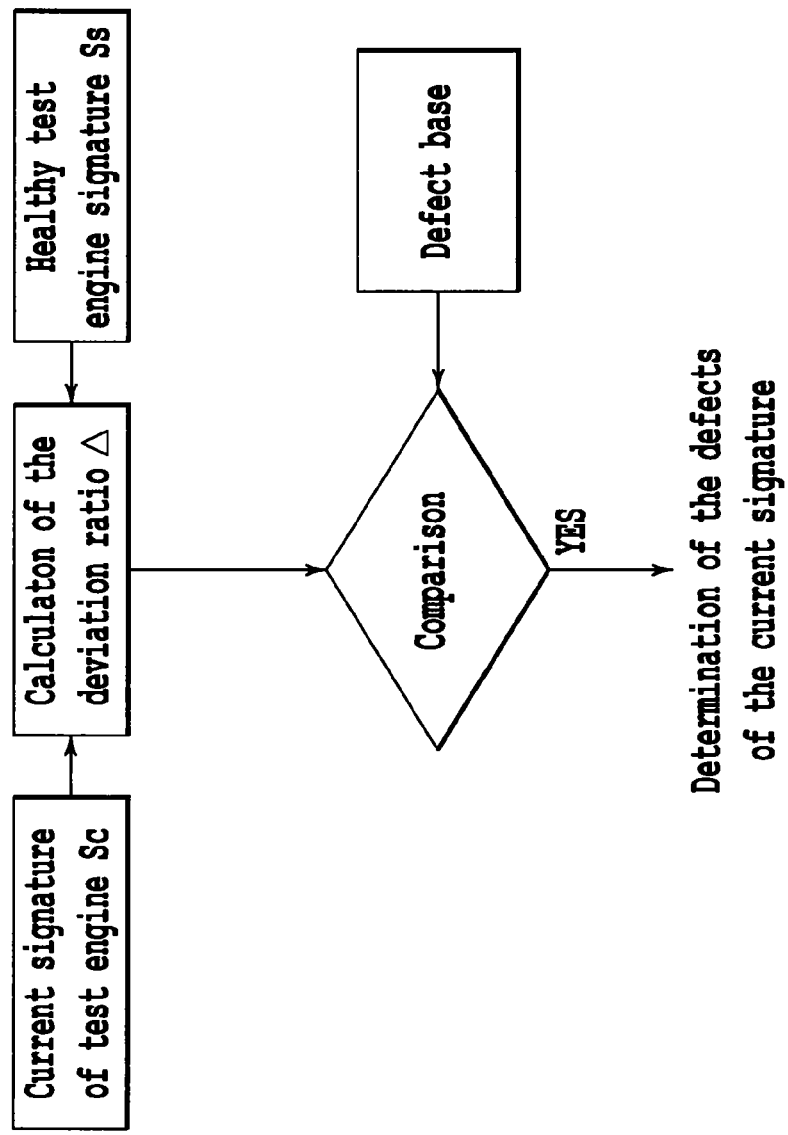
FIG. 9 represents the comparison test for the current signature of the test engine Se with the healthy signature of the engine Ss so as to determine the defects in the engine roller bearings.

Referring to FIG. 7, the family signature Sfam of a family of engines is calculated from individual vibration signatures of a plurality of engines of a same family, so called reference signatures Sref of an engine. The family signature Sfam is evaluated by making the mean of the reference signatures Sref of the engines of the family (mean of the means and mean of the variances).

Figure 6:
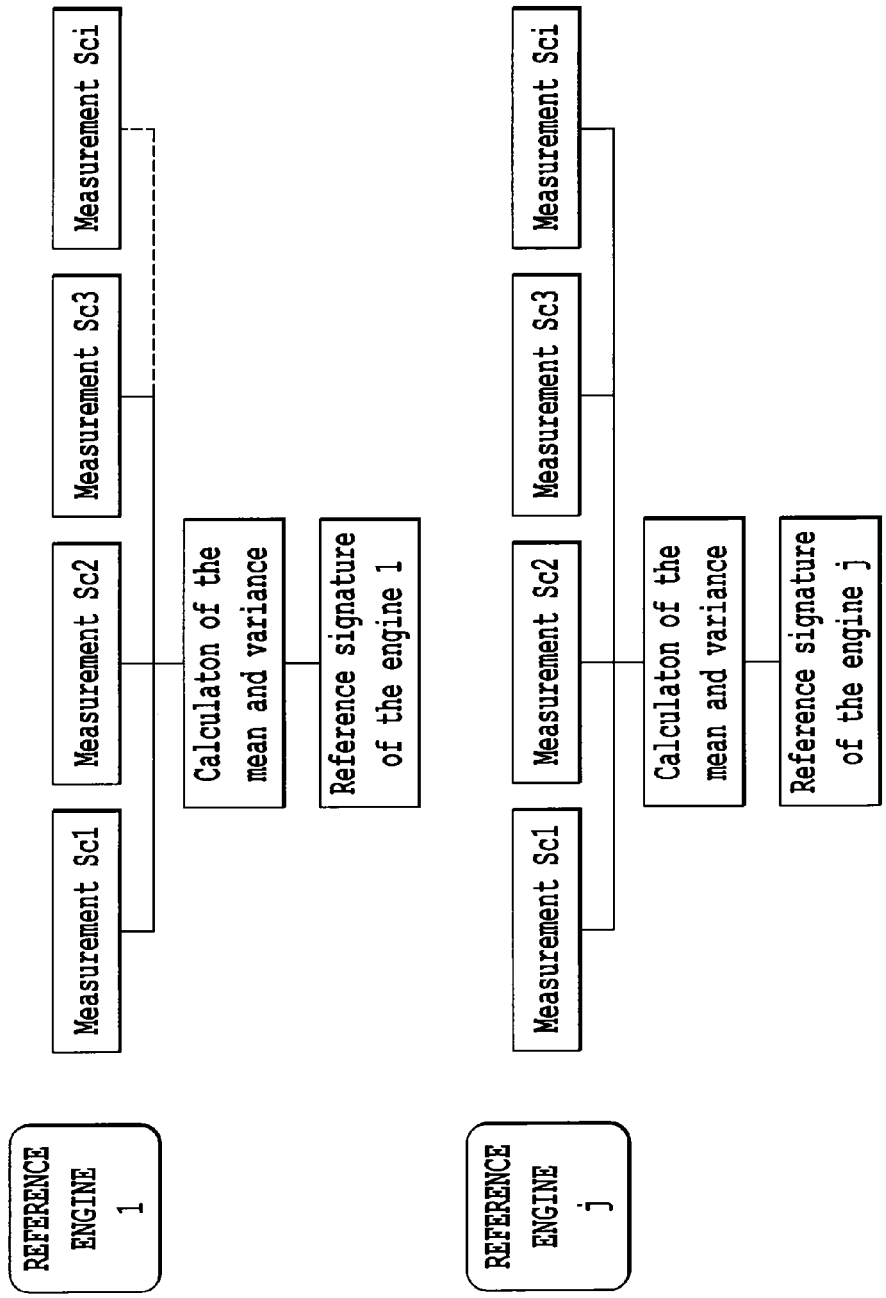
FIG. 6 represents the formation step for the reference signatures of engines of a same family from the current signatures of said engines.

Each reference signature Sref of an engine is evaluated by making the mean of the current individual signatures of said engine (mean of the means and mean of the variances) as represented on FIG. 6. The formation method for the current individual signature for a reference engine corresponds to the previous steps S1 to S6 implemented upon the first flights of said reference engine.

Referring to FIG. 7, in order to form the family signature Sfam from the reference signatures Sref, it is ensured that the reference signatures Sref are all representative of a healthy behaviour of the engines, for example by eliminating extreme reference signature Sref by the percentile methods or by applying a method of the type "all except one" known from the man of the art under its English designation "leave-oneout cross validation", wherein, for each reference signature Sref of an engine, a discordance ratio of the reference signature Sref is calculated with respect to a temporary family signature Y formed from all the other reference signatures Sref of the other engines.

Then, it is checked that the family discordance ratio of the reference signature Sref is not higher than a predetermined discordance threshold. In other words, it is checked that the reference signature of the engine is not too far (in terms of statistical deviation) of the temporary family signature. In case of an overtaking of the discordance threshold for a reference signature Sref, the latter is considered as invalid.

Such method is integrated for all the reference signatures Sref and from the set of reference signatures Sref, those which are invalid are eliminated. The remaining individual reference signatures are averaged to obtain the family signature Sfam of the family of engines.

The family signature Sfam being obtained, for each new engine, a healthy vibration signature (Ss) is formed from a plurality of current vibration signatures of the engine upon the first flights thereof. Indeed, it is upon its first flights that the roller bearings of the engine are able to be healthy. In order to validate the healthy vibration signature Ss of this engine, it is sufficient to check that the healthy vibration signature Ss of this engine is not too far from the family signature Sfam in terms of statistical deviation. Preferably, a new discordance ratio is calculated for said healthy signature with respect to the family signature Sfam.

If the comparison of the healthy vibration signature Ss of the engine with the family signature Sfam shows a significant deviation, the behaviour of the engine being analyzed is considered as atypical: a more detailed analysis should allow the origin of this anomaly to be identified. In all cases, the healthy vibration signature Ss of the engine being not validated is rejected. If the healthy signature Ss is validated for the engine, it is used as a reference for the engine damaging method.

—Calculation of the Deviation Ratio $\Delta$

Referring to FIG. 5, a deviation ratio $\Delta$ (curve 5d) is calculated between the current vibration signature Se of the engine (curve 5a), being previously calculated, and a healthy vibration signature Ss of the engine (curve 5b), previously validated.

Preferably, the deviation ratio $\Delta$ is regularly calculated (for example once per flight) so as to follow the evolution of the damage for each of the engine roller bearings.

The comparison of the current vibration signature Se with the healthy vibration signature Ss can be made on different ways.

If the healthy vibration signature Ss is only made of a few flights, typically less than a ten, the variance is not correct on each point of the order field, it is then judicious to calculate an alpha deviation ratio $\Delta\alpha$ as hereinunder, where n corresponds to a number of standard deviations under which no significant deviation may appear, Se corresponds to the value of the current vibration signature and Ss corresponds to the value of the healthy vibration signature:

$$\Delta\alpha = \text{maximum}(0, Se-(Ss=n\times\text{variance}^{1/2}))$$

An alternative, when the healthy vibration signature Ss is "rich" enough, typically more than a ten of flights, consists in calculating, for each point of the order field, a beta deviation ratio $\Delta\beta$ being known from the man of the art under the designation "z-score" hereinunder.

$$\Delta\beta = (Sc-Ss)/\text{variance}^{1/2}$$

In other words, further to the comparison, a deviation ratio $\Delta$ (alpha or beta) is obtained between the current vibration signature Se and the healthy vibration signature Ss, thereby allowing to characterize the amplitude of the orders of the damages, the orders connected to the intrinsic operation of the engine having been subtracted or smoothed by the calculation of the deviation ratio. In other terms, the deviation ratio $\Delta$ represents the disturbance detected in the current vibration signature Se.

The deviation ratio $\Delta$ according to the invention is particularly relevant because it takes into account the healthy signature Ss of the engine, on which the damaging detection is made. Moreover, the healthy signature Ss is custom-made for said engine, the calculated deviation ratio being then more relevant than a deviation obtained only from thresholds as in the prior art.

Alternatively, the current vibration signature of the engine Se, previously calculated, is directly compared to the family signature Sfam being previously described without calculating a healthy signature Ss of the engine. The family signature Sfam can advantageously be used on a great number of engines, thereby accelerating the wear detection for the set of said engines, the healthy signature Ss of the engine being not to be searched in a database for healthy signature Ss.

(S8) Identification of the Damages

One database for defect indicators is provided for listing the theoretical damages of the engine roller bearings. This base is expressed in the order field.

Consequently, it is possible to quantify the presence of a roller bearing damage and to identify such roller bearing by sweeping, roller by roller, rolling component by rolling component the defect indicators build from frequencies characteristic of this roller bearing (component by component).

Indeed, the frequencies characteristic of a damaging of a roller bearing are functions depending on the geometry of the roller bearing of the number of rolling elements and of the rotation speed of the shaft. The multiples of the frequency characteristic of damaged roller bearings can be integer multiples. Thus, a damage of a roller bearing can be represented by a frequency comb ($f_{car}, f_{2car}, f_{3car}, f_{4car}, \ldots, F_{ncar}$) which is stored in the database by a defect indicator (partially represented by the table 5c).

The calculated deviation ratio $\Delta$ is compared to each of the indicators of the defect base. For each increment of the comb, the mean value of the comb is calculated by dividing the sum of the amplitudes of the comb by the number of teeth in the comb. The calculation of the maximums for each comb, i.e. for each comb, then allows to identify, the case being, the damaging of a roller bearing upon the current flight.

Conventionally, a ratio R is calculated between each amplitude peak of the comb and the associated amplitude of the deviation ratio $\Delta$ previously calculated as represented on FIG. 5e. This ratio R is compared to at least one predetermined damaging threshold so as to determine if the roller bearing is damaged.

Consequently, the amplitude level for a healthy roller bearing is defined from a mean estimated with different healthy engines and different acquisitions upon trials. As far as the damaging thresholds are concerned, there are defined from trials with the damaged roller bearing or from the experience with damaged roller bearings similar to the one for which the threshold should be defined.

According to an advantageous disposition of the invention, the ratio R between an amplitude peak and the amplitude level defined for a healthy roller bearing is first compared to a low damaging threshold. Of course, it could be contemplated to compare the ratio R with a higher number of damaging thresholds than two so as to refine more the damaging degree of the roller bearing.

The invention claimed is:

1. A detection method for a damage of at least one roller bearing rotationally supporting at least one rotary shaft of an engine, comprising:
   a) defining a measuring period during which a shaft speed varies between a low speed and a high speed that is higher than the low speed, said low speed and said high speed belonging to a wide range of speeds up to a maximum speed;
   b) acquiring over the whole measuring period a current vibration signal of a mechanical vibration in engine components;
   c) sampling the current vibration signal during the measuring period;
   d) synchronizing the sampled vibration signal with respect to variations of the shaft speed over the measuring period;
   e) converting the sampled and synchronized vibration signal into a frequency signal so as to obtain frequency spectral lines arranged according to the shaft speed that is a rotation speed of the shaft;
   f) calculating a mean amplitude of the spectral lines so as to obtain a current vibration signature for the engine;
   g) calculating a deviation ratio between the current vibration signature of the engine and a healthy reference vibration signature; and
   h) comparing the deviation ratio to defect indicators of a predefined database, listing theoretical damages of the at least one roller bearing of the engine so as to determine potential damages of the at least one roller bearing.

2. The method according to claim 1, wherein the healthy reference vibration signature is a healthy reference vibration signature of the engine.

3. The method according to claim 2, wherein the healthy reference vibration signature of the engine is formed by calculating a mean of current vibration signatures of the engine being measured over a determined period of a lifetime of the engine, including at start.

4. The method according to claim 3, wherein the healthy reference vibration signature of the engine has been previously validated by comparison to a standard family signature defined for a family of the engine.

5. The method according to claim 4, wherein the standard family signature is formed from healthy reference signatures of engines of a same family.

6. The method according to claim 5, wherein:
   a set of healthy reference signatures is formed for a plurality of engines of the same family;
   a family discordance ratio is calculated for each healthy reference signature by measuring a statistical deviation between the healthy reference signature and the other healthy reference signatures of the set;
   from the set of healthy reference signatures, those of the healthy reference signatures having a discordance ratio higher than a determined discordance ratio are removed; and
   the standard family signature is formed from remaining reference vibration signatures.

7. The method according to claim 6, wherein:
   a family discordance ratio is calculated for each healthy reference signature by measuring a statistical deviation between the healthy reference signature and a temporary family signature formed from the other healthy reference signatures of the set.

8. The method according to claim 1, wherein the method further comprises eliminating spectrogram noise as a function of structural modes of the engine, the noise elimination being performed before calculating the mean amplitude of the spectral lines.

9. The method according to claim 1, wherein the vibration signal being sampled with respect to the variations of the shaft speed over the measuring period by sampling again the signal being sampled at constant frequency is synchronized into a signal being sampled at a frequency proportional to the shaft speed.

10. The method according to claim 1, wherein the vibration signal being sampled with respect to the variations of the shaft speed over the measuring period by calculating an angular path curve of the shaft in an order field and by projecting the current vibration signal on the angular path curve so as to obtain a synchronized current vibration signal.

11. The method according to claim 1, wherein the healthy reference vibration signature is a standard family signature defined for a family of the engine.

12. The method according to claim 11, wherein the standard family signature is formed from healthy reference signatures of engines of a same family.

13. The method according to claim 1, wherein the high speed of the shaft speed includes a full speed.

14. The method according to claim 1, wherein the low speed of the shaft speed includes an idling speed.

* * * * *

UNITED STATES PATENT AND TRADEMARK OFFICE
CERTIFICATE OF CORRECTION

| | | |
|---|---|---|
| PATENT NO. | : 9,032,803 B2 | Page 1 of 1 |
| APPLICATION NO. | : 13/508172 | |
| DATED | : May 19, 2015 | |
| INVENTOR(S) | : Julien Griffaton | |

It is certified that error appears in the above-identified patent and that said Letters Patent is hereby corrected as shown below:

In the Specification

In column 1, line 4, the text "BACKGROND OF THE INVENTION." should read
-- BACKGROUND OF THE INVENTION --.

In column 2, lines 58-59, the text "between a low speed and a low speed." should read
-- between a low speed and a high speed --.

Signed and Sealed this
Second Day of February, 2016

Michelle K. Lee
*Director of the United States Patent and Trademark Office*